D. R. BOWEN.
SHAFT OR ROLL BEARING.
APPLICATION FILED MAR. 15, 1915.
1,158,436. Patented Nov. 2, 1915.
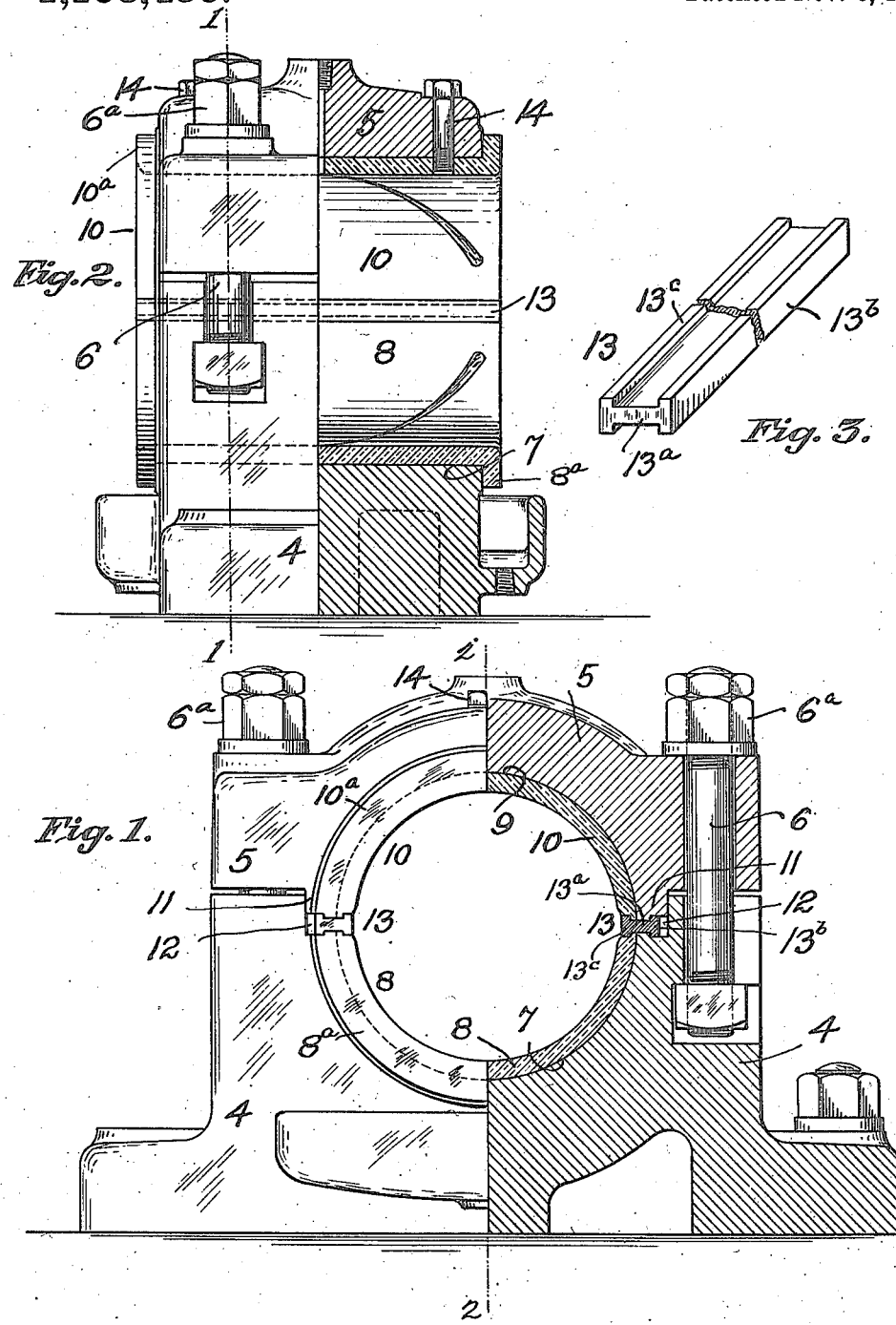
WITNESSES:
INVENTOR.
David R. Bowen,
BY
ATTORNEY.

UNITED STATES PATENT OFFICE.

DAVID R. BOWEN, OF ANSONIA, CONNECTICUT, ASSIGNOR TO FARREL FOUNDRY & MACHINE COMPANY, OF ANSONIA, CONNECTICUT, A CORPORATION OF CONNECTICUT.

SHAFT OR ROLL BEARING.

1,158,436.   Specification of Letters Patent.   Patented Nov. 2, 1915.

Application filed March 15, 1915. Serial No. 14,457.

*To all whom it may concern:*

Be it known that I, DAVID R. BOWEN, a citizen of the United States, residing in Ansonia, county of New Haven, State of Connecticut, have invented certain new and useful Improvements in Shaft or Roll Bearings, of which the following is a full, clear, and exact description.

This invention relates to a shaft or roll bearing of the type which is furnished with a lining of special bearing metal, such as bronze, babbitt, brass, or the like.

Heretofore it has been a common practice to construct the lining of two or more sections interposed between the base or pillow block and the cap, and forming a complete circle. Considerable difficulty has been encountered in locking the lining sections in place in a satisfactory way so as to prevent them from turning with the journal, and in preventing one or more sections from buckling under the weight of the journal, particularly when the lining becomes more or less worn.

The object of my invention, therefore, is to provide simple and effective means for locking the lining sections against creeping or turning in their seat or seats, and it is aimed to provide a construction in which this locking means will absolutely prevent the lining sections from buckling or springing inward at their side edges so as to bind against the journal.

It is also aimed to improve the general construction of devices of the class to which my invention relates.

To these and other ends, the invention consists in the novel features and combinations of parts to be hereinafter described and claimed.

In the accompanying drawings, Figure 1 is a front elevation of a bearing embodying my improvements, taken partly in section on line 1—1 of Fig. 2; Fig. 2 is a side elevation of the bearing, partly in section on line 2—2 of Fig. 1; and Fig. 3 is a detail perspective view of one form of locking bar.

Referring to the drawing, the pillow block or pedestal base of the bearing, shown at 4, may be of any preferred construction, and the pedestal cap 5 is adapted to be bolted to the base by bolts 6. The base 4 is provided with an approximately semi-circular seat 7, which accommodates a correspondingly shaped lining section 8, and the cap 5 is provided with a seat 9 similar to the seat 7, and adapted to accommodate a lining section 10. This latter lining section is similar to the section 8, and forms in conjunction therewith an approximately complete circular bearing for the journal (not shown). Although I have shown the bearing as having two lining sections, the lining may be constituted by a greater number if desired without departing from the scope of the invention. Preferably, the lining sections will be provided at both ends with lateral flanges $8^a$, $10^a$ respectively, for holding said sections against lengthwise movement in the bearing, the flanges $8^a$ of section 8 being abutted against the front and rear surfaces respectively of the base, and the flanges $10^a$ of section 10 being abutted against the front and rear surfaces respectively of the cap. In order to prevent the cap 5 from moving laterally relative to the base 4, the former is provided at opposite sides with depending shoulders or projections 11 adapted to fit a recess in the base which is formed by cutting longitudinal notches or rabbets 12 at opposite sides of the base at the side margins of the seat 7. When the cap is assembled on the base its shoulders or projections 11 pass down into the notches 12 to a certain extent.

In the form shown, a locking device for the lining sections is interposed between each shoulder 11 of the cap and the opposing surface of the base, and preferably the locking device will be constituted by a bar which is rigidly held in position between the base and cap, and which has a portion entering between the adjacent side edges of the lining sections at that side of the bearing so as to prevent said sections from turning in their seats. As the locking bars at opposite sides of the lining are alike, a description of one will suffice. A preferred form of the locking bar is indicated at 13, and it will be noted that said bar is of approximately H-section. This provides a web $13^a$ positioned securely between the opposing portions of the cap and base; a flange $13^b$ engaging grooves in the cap and base so as to prevent inward radial movement of the bar relative to the bearing; and a flange $13^c$ interposed between the adjacent side edges of the lining sections and fitting longitudinal grooves or rabbets in said sections, The clamping of the bar in position between the base and cap locks it firmly in position, and the interposition of a portion of said bar between the adjacent side edges of the lining sections obviously prevents rotation of the lining in the bearing. Furthermore, it will be evident that by engaging the flange 13ᶜ in grooves or rabbets of the lining sections, as above described, the side edge portions of the lining sections will be effectively prevented from buckling or springing in an inward direction relative to the bearing. In some constructions, the weight of the journal on the lower liner causes the side edges to spring inward and bind against the journal, but this disadvantage is altogether obviated in my construction.

As the locking bars are usually not constructed of bearing metal, the arrangement will be such that the flanges 13ᶜ will not bear against the journal. In the form shown, the inner faces of the flanges 13ᶜ form the bottoms of shallow recesses in the lining, and these recesses serve for the collection and distribution of lubricant. By preference, the locking bars will be co-extensive in length with the liners, extending through the flanged ends of the latter, and having their front and rear extremities flush with the front and rear faces of the respective flanges.

With my improved construction, the assemblage of the bearing is a very simple matter. The lining section 8 is placed in the base and the bars 13 are then placed in the grooves or rabbets 12 in position to overlie the side edges of said lining section. Before the cap is placed on the base, the lining section 10 is placed in its proper position in the cap, and is held therein by any appropriate means, such as the bolts 14. The cap is then lowered onto the base so as to fit over the main bolts 6, and the shoulders 11 and the side edges of section 10 pass into locking engagement with the bars 13 as the cap reaches its ultimate assembled position. The nuts 6ᵃ are then screwed up on the bolts 6, and the assemblage is complete. As the lining sections become worn, they may be readily approached toward each other to the desired extent after disassembling the parts, and filing down certain surfaces of the locking bars, as will be obvious.

I have not attempted to describe the various modifications of the construction which might suggest themselves to those skilled in the art, without departing from the scope of the invention.

What I claim is:

1. In a shaft or roll bearing, the combination of a base having a lining seat, a cap having a lining seat, lining sections fitting the respective seats, a single locking bar at each side of the bearing free of the base and cap but interposed therebetween so as to be anchored thereby, each of said bars also being interposed between the lining sections, and means for securing the cap to the base so as to hold said locking bars in position; substantially as described.

2. In a shaft or roll bearing, the combination with a base and cap having lining seats and lining sections fitting said seats, of a locking bar at each side of the bearing having a portion interposed and anchored between the base and cap, and another portion engaging the lining sections so as to prevent inward radial movement as well as turning movement of said sections; substantially as described.

3. In a shaft or roll bearing, the combination of a base, a cap, lining sections for the base and cap respectively, a locking device adapted for support on the base and having a portion to overlie the lining section of the base, the cap and the lining section thereof being constructed to make a locking fit with said locking device when the cap is lowered onto the base, and means for clamping the cap to the base; substantially as described.

4. In a shaft or roll bearing, the combination of a base and cap having lining seats, lining sections for the respective seats, the base and base lining section presenting in conjunction a seat for a locking bar, a locking bar fitting said seat, the cap being constructed to clamp said bar between it and the base as the cap is lowered onto the base, and the cap lining section being constructed to interlock with the bar at the side opposite the lower lining section; substantially as described.

5. In a shaft or roll bearing, the combination of a base and cap having lining seats, lining sections for the respective seats, the base and the base lining section being provided at one side of the bearing with a seat for a locking bar, a locking bar fitting said seat, the cap being constructed to clamp said locking bar between it and the base as the cap is lowered onto the base, and the lining section of the cap being constructed to interlock with that portion of the bar which overlies the lower lining section; substantially as described.

6. In a shaft or roll bearing, the combination of a base, a cap superposed thereon, lining sections for the base and cap respectively disposed with their side edges adjacent each other, and a locking bar clamped between the base and cap at the side of the bearing and interlocked with the adjacent side edges of the lining sections to prevent turning movement in the bearing or displacement of the lining sections in an inward direction; substantially as described.

7. In a shaft or roll bearing, the combination of a base having a seat and a notch or rabbet at one side of said seat, a cap having a seat and superposed on the base, said cap having a shoulder adapted to overlie said notch or rabbet, a locking device clamped in said notch or rabbet by the shoulder of said cap, and lining sections for the base and cap respectively fitting said seats and engaged with said locking device; substantially as described.

8. In a shaft or roll bearing, the combination of a base, a cap, lining sections therefor, and a bar of angular cross-section anchored between the base and cap to prevent inward radial movement of said bar, and interlocked with the lining sections to prevent either turning movement or radial inward movement of said lining sections; substantially as described.

9. In a shaft or roll bearing, the combination of a base, a cap, lining sections for the base and cap, and a locking bar having a flange clamped by and between said base and cap, and a second flange interlocked with two lining sections; substantially as described.

10. In a shaft or roll bearing, the combination of a base, a cap, lining sections for said base and cap respectively having adjacent side edges or margins, and an H-bar interposed between and interlocked with said base and cap, and interposed between and interlocked with the side edges or margins of the respective lining sections; substantially as described.

11. In a shaft or roll bearing, the combination of a base having a lining seat, a cap having a lining seat, lining sections in said seats, locking bars adapted to be supported on and engaged with the base and the lining section thereof, before the cap is assembled, said cap and its lining section being formed to interlock with said bars when the cap is placed in position on the base, means for holding the lining section of the cap in place in the latter during assembling, and means to clamp the cap on the base to hold said bars in locking position; substantially as described.

12. In a shaft or roll bearing, the combination of a base, a cap, lining sections for the base and cap respectively, and means for interlocking the lining sections with the cap and base as the cap is lowered onto the base; substantially as described.

In witness whereof, I have hereunto set my hand on the 11th day of March, 1915.

DAVID R. BOWEN.

Witnesses:
CARL F. SCHNUCK,
MILDRED V. ALDEN.